United States Patent [19]
Townsend

[11] 3,825,272
[45] July 23, 1974

[54] FACE SEAL FOR FOOD PROCESSING EQUIPMENT
[75] Inventor: Ray T. Townsend, Des Moines, Iowa
[73] Assignee: Townsend Engineering Company, Des Moines, Iowa
[22] Filed: May 19, 1971
[21] Appl. No.: 144,879

[52] U.S. Cl............... 277/94, 277/95, 277/206 R, 308/36.1
[51] Int. Cl............................................ F16j 15/34
[58] Field of Search.......... 277/94, 95, 206 R, 81 R, 277/84, 91, 181, 182, 183; 308/187, 36.1

[56] References Cited
UNITED STATES PATENTS
2,950,135  8/1960  Adamson........................... 277/182
FOREIGN PATENTS OR APPLICATIONS
558,544  1/1944  Great Britain..................... 277/206

Primary Examiner—Samuel B. Rothberg
Attorney, Agent, or Firm—Zarley, McKee & Thomte

[57] ABSTRACT

A face seal which is especially well adapted for use in food processing equipment is disclosed herein. A rotatable member such as a toothed roll has its opposite ends rotatably journaled in bearing members having an annular groove formed therein. The annular grooves are positioned adjacent the ends of the rotatable member and are in communication with the outer periphery of the bearing member. A lip element overhangs and extends around and partially over each of the annular grooves to partially enclose the same. A resilient sealing element is positioned in the annular groove and engages the rotatable and bearing members to form a face seal therebetween. At least one-half the thickness of the sealing element is exposed to view from beyond the outer periphery of the bearing member to permit visual inspection and cleaning of the exposed portion of the sealing element.

1 Claim, 4 Drawing Figures

PATENTED JUL 23 1974 3,825,272

INVENTOR
RAY T. TOWNSEND
BY
Zarley, McKee & Thomte
ATTORNEYS

FACE SEAL FOR FOOD PROCESSING EQUIPMENT

Federal regulations require that government inspectors periodically inspect equipment which is being employed in food processing operations. The government inspectors must be able to easily inspect the equipment, and it is desirable to have the equipment built so that it can be easily cleaned. Heretofore, in food processing machines such as certain skinning machines, it was extremely difficult to inspect the area between the ends of the toothed roller and the stationary bearing members. Additionally, it was extremely difficult to clean these areas.

Therefore, it is a principal object of this invention to provide a face seal which is especially well adapted for use in food processing equipment.

A further object of this invention is to substantially open up the annular groove which houses the face seal so that the area between the toothed roll and the stationary bearing member can be easily inspected and can be easily cleaned.

A further object of this invention is to provide a face seal for use in food processing equipment which is compressed into the annular groove formed in the bearing member.

A further object of this invention is to provide a face seal for use in food processing equipment wherein at least one-half the thickness of the face seal is exposed to view from beyond the outer periphery of the bearing member of the food processing equipment.

A further object of this invention is to provide a face seal for use in food processing equipment which has a unique cross-sectional configuration.

A further object of this invention is to provide a face seal for use in food processing equipment which is economical of manufacture, durable in use and refined in appearance.

These and other objects will be apparent to those skilled in the art.

This invention consists in the construction, arrangements and combination of the various parts of the device, whereby the objects contemplated are attained as hereinafter more fully set forth, specifically pointed out in the claims, and illustrated in the accompanying drawings, in which:

Figure 1:
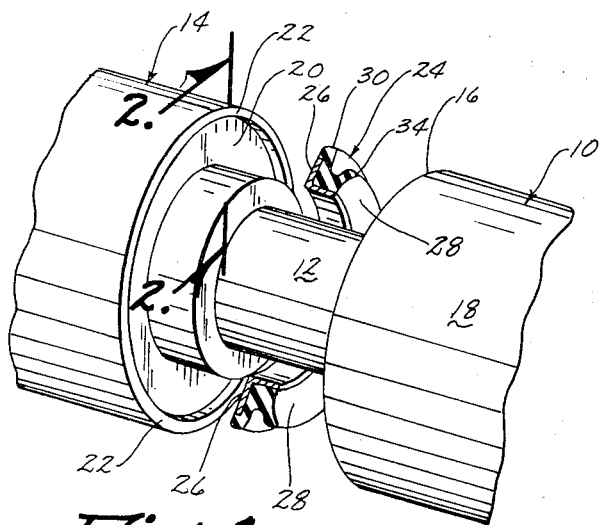
FIG. 1 is a partial exploded perspective view illustrating a stationary member, face seal and rotatable member with a portion of the face seal cut away to more fully illustrate the invention.

The numeral 10 generally designates a rotatable member having its reduced diameter portion 12 rotatably journaled in one end of a stationary bearing member 14. Only one end of the member 10 has been shown but it should be understood that the other end of the member 10 would be identically rotatably journaled in a bearing member. In a food processing machine such as a meat skinning machine, the member 10 would be a toothed roller. A face portion or shoulder 16 is defined between the reduced diameter portion 12 and the outer periphery 18 of the rotatable member 10.

Figure 2:
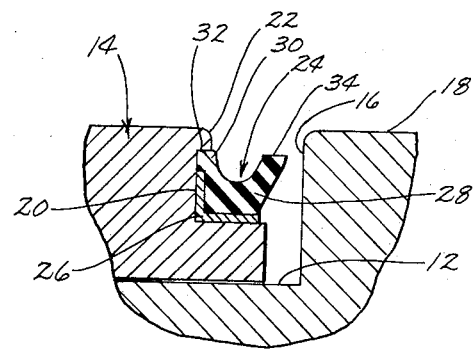
FIG. 2 is an enlarged sectional view seen along lines 2—2 of FIG. 1.
Figure 3:
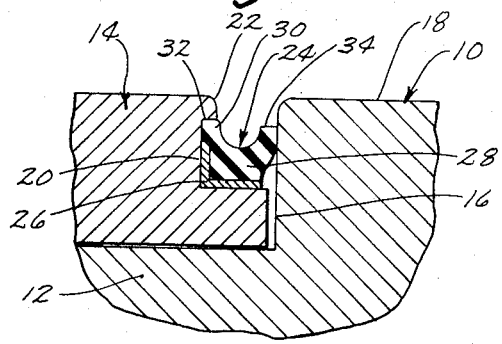
FIG. 3 is a view similar to FIG. 2 except that the face seal is illustrated in its operative position.

An annular groove 20 is formed in the end of the bearing member 14 which is in communication with the outer periphery thereof. A lip element 22 overhangs and extends around and partially over the groove 20 to partially enclose the same. As seen in FIGS. 2 and 3, the annular groove 20 is substantially rectangular in cross-section.

The numeral 24 refers to a sealing element which is adapted to be positioned in the groove 20 and comprises generally a metal reinforcing backing element 26 and a resilient seal 28 which is bonded thereto. It is preferred that the seal 28 be comprised of nitrile butadiaene, neopren, teflon, or any elastomer product. FIG. 2 illustrates the sealing element 24 positioned in the annular groove 20 prior to the seal 28 being compressed. It is important to note that the portion 30 of the seal 28 is compressed in the "upper" corner of the annular groove 20 at 32 to maintain the sealing element 24 in the groove 20. As seen in FIG. 2, the seal 28 includes a wall portion 34 which extends laterally outwardly therefrom.

FIG. 3 illustrates the relationship of the sealing element 24 and the face portion 16 of the member 10 when the member 10 is in an operative position with respect to the bearing member 14. In FIG. 3, it can be seen that the wall portion 34 engages the face portion 16 and is deflected thereby to form a face seal between the member 10 and the bearing member 14. The relationship of the sealing element 24 and the lip element 22 is such that at least half of the thickness of the sealing element 24 is exposed to view from beyond the outer periphery of the member 14 to permit easy visual inspection and cleaning of the exposed portion of the sealing element 24. To insure the easy visual inspection and cleaning of the exposed portion of the sealing element 24, the lateral width of the lip element 22 should not be more than half the lateral width of the annular groove 20.

Figure 4:
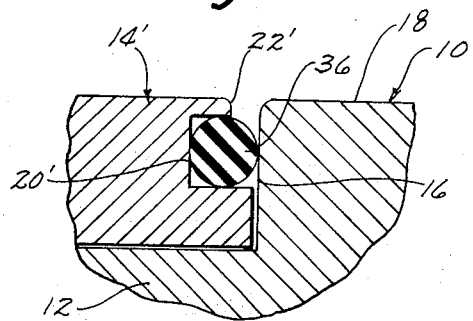
FIG. 4 is a sectional view similar to FIG. 3 except that a modified configuration of the face seal is illustrated.

A modified embodiment is illustrated in FIG. 4 and it can be seen that the lip element 22' in FIG. 4 has a lateral width slightly greater than the lateral width of the lip element 22 in FIGS. 1-3. A resilient O-ring 36 is "press-fit" into the annular groove 20' and sealably engages the face portion 16 of the rotatable member 10 to form a face seal therebetween. The relationship of the lip element 22', annular groove 20' and the O-ring 36 is such that a large portion of the O-ring 36 is exposed to view beyond the outer periphery of the member 14' to permit easy visual inspection and cleaning of the exposed portion of the O-ring 36.

While the configuration illustrated in FIGS. 1-3 is the preferred embodiment, both of the embodiments provide a means to permit the easy visual inspection of the food processing equipment and permit convenient access to facilitate cleaning thereof. The sealing elements prevent food particles from entering the inner portion of the face portion 16 and are easily cleaned due to their relationship with the lip elements. Thus it can be seen that the face seal of this invention accomplishes at least all of its stated objectives.

I claim:

1. In combination a rotatable member rotatably journaled in a bearing member, an annular groove extending around the outer periphery of said bearing member, an annular lip element extending partially over said groove;

said groove having a bottom wall concentric with and parallel to the rotational axis of said rotatable member, said groove also having an inner side wall extending radially outwardly from said bottom wall to connect said bottom wall with said lip element, said lip element having an inner wall in spaced apart parallel relationship with said bottom wall;

said bottom wall forming the bottom surface of said annular groove, a face wall on said rotatable member in spaced apart parallel relationship with inner side wall of said groove, a sealing element in said annular groove, said sealing element comprising a ring-like metal backing member having an L-shaped cross-section, and a resilient seal attached to said backing member, said L-shaped cross-section being defined by a first flange element engaging said bottom wall and a second flange element extending along said inner side wall and terminating in an outer edge spaced radially inwardly from the inner wall of said lip element, said resilient seal having an inner peripheral portion secured to said first flange element and a side portion secured to said second flange element, said resilient seal having a laterally extending portion extending between and being compressed between said outer edge of said second flange element and the inner wall of said lip element whereby said seal element is retentively held in said groove, said lip element being shorter than the width of said annular groove to permit said groove to be substantially open at its outer periphery between said lip element and the face wall of said rotatable member, said sealing element extending laterally away from said inner side wall of and annular groove beyond said lip element and engaging in sealing contact the face wall of said rotatable member, said sealing element including an arcuate peripheral trough means formed in the outer radial surface thereof beyond said lip element, said trough means being exposed to view from beyond the outer periphery of said annular groove to permit inspection and cleaning of said seal element.

* * * * *